(12) United States Patent
Ito

(10) Patent No.: US 6,385,988 B1
(45) Date of Patent: May 14, 2002

(54) DUSTPROOF IMPLEMENT

(75) Inventor: Nobuhiro Ito, Nagoya (JP)

(73) Assignee: Kabushiki Kaisha Unicla (JP)

( * ) Notice: Subject to any disclaimer, the term of this patent is extended or adjusted under 35 U.S.C. 154(b) by 0 days.

(21) Appl. No.: 09/761,279

(22) Filed: Jan. 16, 2001

(30) Foreign Application Priority Data

Jan. 16, 2001 (JP) .......................................... 2001-7436

(51) Int. Cl.$^7$ .......................... F25B 27/00; F04B 35/00; F16D 19/00
(52) U.S. Cl. ...................... 62/323.4; 417/319; 192/84.1
(58) Field of Search ........................ 62/323.4; 417/319; 192/84.1

(56) References Cited

U.S. PATENT DOCUMENTS

| | | | | |
|---|---|---|---|---|
| 2,807,147 A | * | 9/1957 | Jacobs | ........................ 62/323.4 |
| 3,429,192 A | * | 2/1969 | Allen | ........................... 74/217 |
| 3,743,068 A | * | 7/1973 | Westervelt et al. | ....... 192/84 C |
| 4,169,360 A | * | 10/1979 | Shimizu | ..................... 62/323.4 |
| 4,793,457 A | * | 12/1988 | Siewert et al. | .............. 192/112 |
| 5,396,976 A | * | 3/1995 | Koitabashi | ................ 192/84 C |

* cited by examiner

Primary Examiner—William C. Doerrler
(74) Attorney, Agent, or Firm—Ipsolom LLP

(57) ABSTRACT

A dustproof implement applied to a clutch to be attached to a compressor in an air-conditioning system loaded on a working vehicle, comprises a plate to be disposed opposite to an annular recess of a rotor of the clutch and fixed at the compressor, and an annular pad attached to the annular plate and abutting the rotor on the outer peripheral side of the annular recess of the rotor.

9 Claims, 1 Drawing Sheet

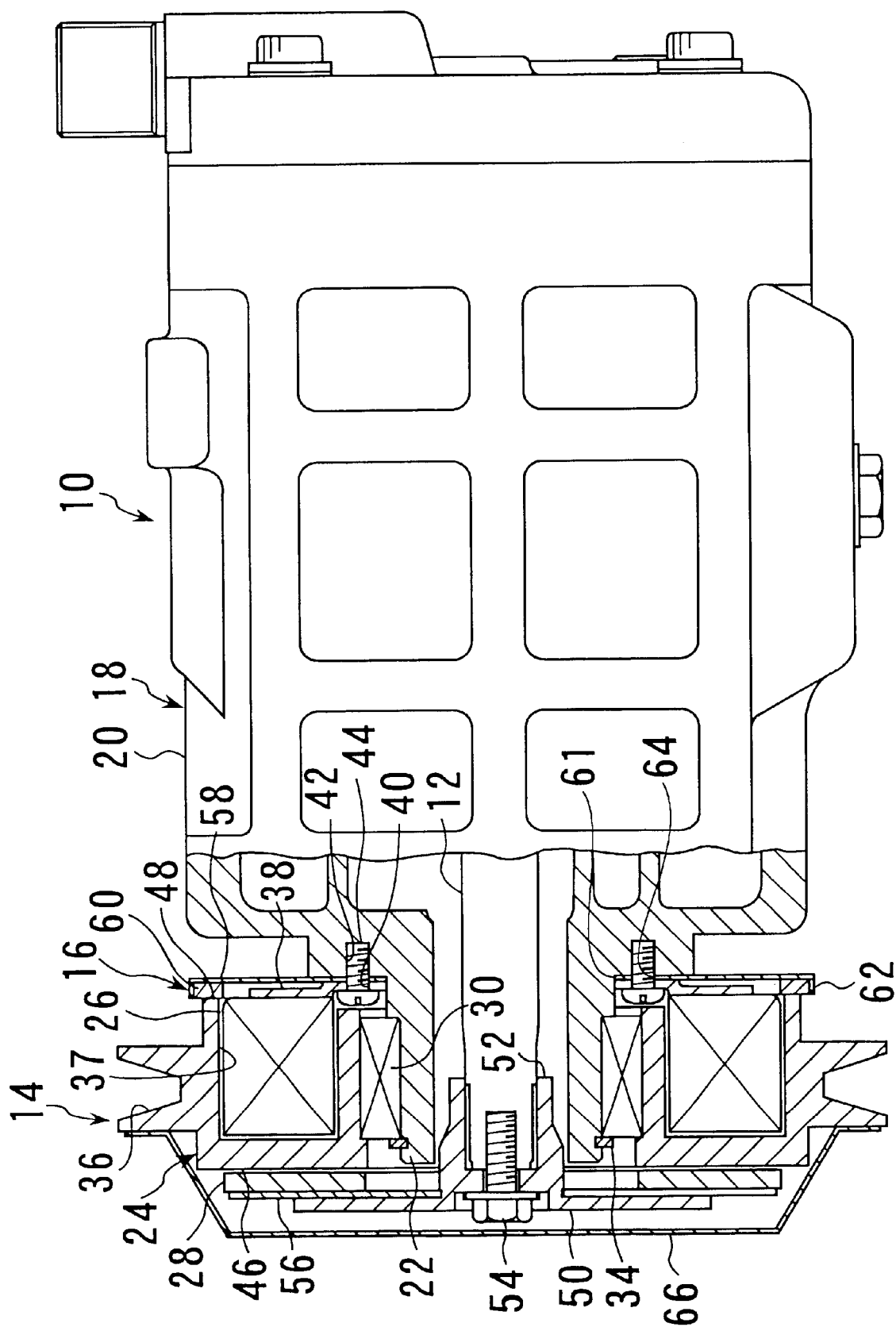

DUSTPROOF IMPLEMENT

BACKGROUND OF THE INVENTION

1. Field of the Invention

This invention relates to a dustproofing device or dustproof implement applicable to a clutch for transmission and interruption of driving force to a compressor which constitutes a part of an air-conditioning system for a working vehicle to be used in agricultural works or civil engineering works.

2. Description of the Prior Art

A working vehicle such as a large agricultural tractor is loaded with an air-conditioning system which aims at cooling and warming its operating space. This air-conditioning system works by rotationally driving a compressor forming a part thereof.

The compressor, like in case of a vehicle for another use such as an omnibus, is placed in the vicinity of an engine and is driven by receiving the rotational force of the engine. Also, in order to perform intermittent air-conditioning, a clutch for ON-OFF switching of the rotational driving state is attached to the compressor.

The clutch includes a plurality of parts surrounding a part of a housing of the compressor which surrounds an end of the rotation shaft of the compressor. In other words, the clutch includes a rotor rotatably borne by a part of the housing and provided with an annular recess opening toward the body of the housing; an annular coil received in the annular recess of the rotor and fixed on the housing body through an annular support plate surrounding the part of the housing; and a friction plate for mechanically connecting the rotor and the rotation shaft of the compressor.

The rotor of the clutch is rotated all the time by receiving rotational power of the engine through a belt. The coil, receiving the electric current, magnetizes the rotor and attracts the friction plate to the rotor. Due to the magnetic adsorption of the friction plate to the rotor, the rotor and the shaft of the compressor are mechanically connected, and the rotation force of the rotor is transmitted to the shaft of the compressor, thereby driving the compressor. On the contrary, when the electric current to the coil is stopped, the mechanical connection is released to stop driving the compressor.

In the working vehicle such as a large agricultural tractor, different from a car, there are many chances for dust, mud and the like to enter into gaps between the rotor of the clutch and the coil received in the annular recess due to the work and cause a rotation failure to the rotor.

Heretofore, to prevent such dust, mud and the like from entering, the support plate of the coil had a larger diameter, and an annular pad in contact with the rotor on the outer periphery side of the annular recess of the rotor was attached to the support plate.

However, the support plate of the coil having a relatively thick dimension was used, as it was required to support the relatively heavy coil, thereby resulting in an increase in weight of the compressor and clutch assembly and in cost to make the support plate having a large diameter. Further, when applying to a compressor and clutch assembly already loaded, there is such disadvantage as to necessitate replacement of a still usable coil.

SUMMARY OF THE INVENTION

An object of the present invention is, therefore, to provide a dustproof implement which restrains an increase in weight and cost of a compressor and clutch assembly when making a clutch to be attached to a compressor in an air-conditioning system loaded on a working vehicle dustproof, Another object of the present invention is to provide a dustproof implement which does not necessitate replacement of a coil when applied to a compressor and clutch assembly already loaded on the working vehicle.

The present invention relates to a dustproof implement for a clutch which switches transmission of torque relative to the rotation shaft of a compressor constituting a part of an air-conditioning system of a working vehicle. The clutch includes a rotor borne by a part of a housing of the compressor and rotatable about the part, the housing surrounding an end of the rotation shaft of the compressor; and an annular coil received in an annular recess in the rotor and supported by the body continuous with the part of the housing through an annular support plate surrounding the part of the housing. The dustproof implement of the present invention applicable to such a clutch comprises an annular plate disposed between the support plate for the coil and the housing body and fixed at the housing body and opposing to the open face of the annular recess of the rotor so as to cover the open face; and an annular pad attached to the annular plate and contacting the rotor on the outer periphery side of the annular recess of the rotor.

Preferably, the support plate of the coil and the annular plate are fixed on the housing body with a plurality of machine screws penetrating through these plates.

According to the present invention, the dustproof implement is independent from the support body of the coil of the clutch to be attached to the compressor and is disposed between the clutch and the compressor body. The plate of the dustproof implement covers the annular recess of the rotor of the clutch and contacts the rotor on the outer periphery side of the annular recess of the rotor, whereby the annular recess is closed by the dustproof implement. As a result, dust and mud caused at the time of working by the working vehicle, on which the compressor and the clutch assembly are to be loaded, can be prevented from entering into the annular recess of the clutch, and a rotation failure of the rotor thereby can also be prevented.

The pad supported by the plate is far lighter in weight than the coil, the plate can be made very small in thickness and weight, thereby restraining a weight increase of the compressor and clutch assembly as well as an increase in manufacturing cost of the dustproof implement to the minimum.

In addition, even when a compressor and clutch assembly is already incorporated into the working vehicle, the dustproof implement made of a single substance can apply a dustproof measures to the clutch without necessitating any replacement of the coil of the clutch.

Further, the plate of the dustproof implement can be more swiftly and more securely attached to the compressor by fixing the plate of the dustproof implement on the housing body of the compressor together with the support plate of the coil of the clutch with a plurality of machine screws.

BRIEF DESCRIPTION OF THE DRAWINGS

FIG. 1 is a vertical section of the dustproof implement of the present invention applied to a clutch which is attached to a compressor.

PREFERRED EMBODIMENTS OF THE INVENTION

Referring to FIG. 1, there are shown a compressor 10 incorporated in an air-conditioning system (not shown) of a working vehicle such as a large agricultural tractor (not shown) to be used for agriculture or civil engineering thereby constituting a part the air-conditioning system; a clutch 14 attached to the compressor 10 for switching the transmission of the torque or rotating power relative to the rotation shaft 12 of the compressor; and the dustproof implement 16 according to the present invention applied to the clutch.

The compressor 10 has a housing 18.

The housing 18 includes a cylindrical body 20, and a tubular portion 22 coaxially extends from the body. The rotation shaft 12 of the compressor is rotatably borne by a cylinder block (not shown) inside the housing body 20, with its end extending into the tubular portion 22 of the housing.

The compressor 10 works with rotating motion of its rotation shaft 12. The rotation shaft 12 is rotated by receiving the rotating power of the engine of the working vehicle. The rotating power of the engine is transmitted to the rotation shaft 12 through the clutch 14 and released from the state of transmission.

The clutch 14 includes a rotor 24 to be rotated by receiving the rotating power of the engine, an annular coil 26 for magnetizing the rotor 24 by turning on electricity, and a friction plate 28 for mechanically connecting the rotor 24 with the rotation shaft 12 of the compressor and transmitting the rotating force of the rotor 24 to the rotation shaft 12.

The rotor 24 is disposed around the tubular portion 22 of the housing coaxially therewith through a bearing 30 and mounted on the tubular portion 22 so as to be rotatable about the tubular portion 22. The rotor 24 is rotated, receiving the rotating power of the engine through a V-belt (not shown) suspended over a V-groove 36 provided in its outermost periphery. The bearing 30 is hindered from moving in the axial direction of the tubular portion 22 by a snap ring 34 surrounding the tubular portion 22.

The rotor 24 is provided with an annular recess 37 coaxial therewith. The recess 37 is opened toward the housing body 20.

The coil 26 is supported on the housing body 20 through a support plate 38 surrounding the tubular portion 22 of the housing. The support plate 38 has an outer diameter smaller than that of the coil 26 and is welded to one of the end faces of the coil 26. For the sake of assembling the clutch 14, the coil 26 and its support plate 38 are passed into the tubular portion 22 of the housing prior to the rotor 24.

The coil 26 is received in the annular recess 37 of the rotor coaxially therewith, with small gaps (normally of about 1.5 mm) existing between the bottom face of the annular recess 37 as well as both internal and external peripheral wall faces continuous therewith and the other end face as well as both internal and external peripheral wall faces continuous therewith, respectively.

Consequently, the rotor 24 is relatively rotatable to the coil 26. Because of this, however, it is possible for dust and mud produced during plowing operation by the large agricultural tractor, for instance, to enter into the gaps. In order to hinder dust or mud from entering into the gaps, the dustproof implement 16 according to the present invention is disposed between the rotor 24 and the housing body 20 to close the annular recess 37 of the rotor. The dustproof implement 16 will be explained later in detail.

The support plate 38 of the coil 26 is fixed on the housing body 20 with a plurality of machine screws 44 to be engaged with a plurality of threads of screw 42 through a plurality of machine screw holes 40 in the support plate 38.

Further, the friction plate 28 forming a part of the clutch 14 is All generally annular-shaped and confronts one end face 46 of the rotor 24 relative to the axial direction of the rotor 24. Also, the other end face 48 of the rotor 24 defines an open face of the annular recess 37.

The illustrated clutch 14 further has a disk-shaped hub 50. The hub 50 has a cap portion 52 continuous therewith and put on a free end of the rotation shaft of the compressor to cover it. The hub 50 is fixed at the rotation shaft 12 by a bolt 54 which extends through the center of the hub 50 from the free end face of the rotation shaft 12 thereinto and screwed thereto.

The friction plate 28 is located between the hub 50 and the rotor 14 and surrounds the circumference of the cap portion 52. Also, between the friction plate 28 and the hub 50, a spring plate 56 formed from a plurality of radially extended leaves is disposed and fixed at the friction plate 28 and the hub 50 respectively. Consequently, the friction plate 28 is supported at the hub 50 through the spring plate 56.

The friction plate 28, when subjected to magnetic attraction force of the rotor 14 which is magnetized by a supply of electricity to the coil 26, moves due to an elastic deformation of the spring plate 56 around the cap portion 52 in its axial direction toward the rotor 14 to be finally adsorbed to the rotor 14. As a result, the rotor 14 and the rotation shaft 12 are mechanically connected with the friction plate 28 through the spring plate 56 and the hub 50, thereby transmitting the rotating power of the rotor 14, that is, the rotating power of the engine to the rotation shaft 12 to actuate the compressor 10.

On the other hand, if the supply of electricity to the coil 26 is stopped, restoring force of the elastically deformed spring plate 56 to return to its original state makes the friction plate 28 move in the opposite direction around the cap portion 52 to be away from the rotor 14. As a result, the transmission of the rotation force from the rotor 14 to the rotation shaft 12 is released, and the compressor 10 stops working.

The dustproof implement 16 according to the present invention comprises an annular plate 58 and an annular pad 60 coaxially attached to one face of the plate 58.

The dustproof implement 16 can be attached to the compressor 10 by passing the annular plate 58 through the tubular portion 22 of the housing prior to attaching the clutch 14 to the compressor 10 and, as stated later, fixing the plate 58 at the housing body 20 together with the support plate 38 of the coil.

The plate 58 has an inner peripheral face 61 to be in contact with the peripheral face of the tubular portion 22 when passed through the tubular portion 22. Further, the plate 58 has a shape and a size large enough to cover the open face of the annular recess 37 of the rotor when the plate 58 is attached to the housing body 20 and also the clutch 14 is attached to the compressor 10. At this time, the plate 58 and the pad 60 face the open face of the annular recess 37, and the pad 60 is subjected to the pressure of the other face 48 of the rotor 14 on the outer peripheral side of the annular recess 37 of the rotor to be brought into contact with the face 48.

Consequently, the annular recess 37 of the rotor is closed by the plate 58 and the pad 60. Further, the pad 60, due to its pliability, maintains the contact with the rotating rotor 24, thereby preventing the dust and the like produced during the operation of the working vehicle from entering into the annular recess 37 of the rotor, or more particularly, into the gaps between the coil 26 within the annular recess 37 and the rotor 24.

Since the plate 58 is intended to support the pad 60 which is far smaller in weight than the coil 26, its thickness can be as thin as 0.5–0.6 mm. Consequently, the weight increase due to the attachment of the dustproof implement 16 to the compressor and clutch assembly is very small. Also, it is possible to manufacture the dustproof implement 16 at a low cost. The plate 58 is made of, for instance, steel, spring steel, etc.

Further, since the thickness of the plate 58 can be made small as mentioned above, when applying the dustproof implement 16 of the present invention to an existing compressor and clutch assembly in use, excessive narrowing of the gap between the coil 26 and the rotor 14 and a failure in rotation of the rotor due to it can be avoided.

Further, since the dustproof implement 16 is made of a unit independent from the coil 26 of the clutch and the support plate 38, it is not necessary to replace the coil 26 as heretofore when attaching the dustproof implement 16 to an existing compressor and clutch assembly but the coil can be used as it is.

Having a function to support the pad 60, the plate 58 preferably has a slightly larger diameter than the other face 48 of the rotor to ensure its supporting function, and to enhance the function to hold the pad 60, it is desirable to have an end portion 62 bent up at right angles toward the rotor 14. The bent-up end portion 62 covers the outer peripheral surface of the annular pad 60.

The pad 60 preferably has a radial length larger than the thickness (or the radial length) of the outer peripheral side part defining an outer peripheral surface of wall on the other face 48 of the rotor with which the pad 60 comes into contact. This always ensures the contact state of the pad 60 relative to the rotor 14, for instance, even when there is a little eccentric motion of the rotor 14.

The pad 60 contains felt made of a material pliable or flexible enough to maintain the contact with the rotating rotor 14 and resistant to friction heat, for example, heat-resistant nylon felt, polyester felt, felt containing 70 percent or more wool by weight, and the like. The pad 60 can be attached to the surface of the plate 58 and its bent-up end portion 62 by adhesion using an adhesive, or sandwiching between the bent-up end portion 62 and an annular projection (not shown) which can be formed concentrically with the plate, for instance, by pressing.

Also, the plate 58 is preferably provided with a plurality of machine screw holes 64 like the machine screw holes 40 made in the support plate 38 of the coil. This enables both plates 38, 58 to be fixed at one time and readily on the housing body 20 by using the machine screws 44 to be passed through the machine screw holes 40 and 64 which are aligned with each other. The reference numeral 66 represents the dustproof cap.

What is claimed is:

1. A dustproof implement for a clutch for changing over transmission of rotating power relative to the rotation shaft of a compressor constituting a part of an air conditioning system of a working vehicle, the clutch including a rotor borne by a part of a housing of the compressor surrounding the end portion of the rotation shaft of the compressor and rotatable about the part, and an annular coil received in an annular recess provided in the rotor, said annular coil supported on the housing body through an annular support plate surrounding the part of the housing, comprising:

an annular plate disposed between the coil support plate and the housing body and fixed on the housing body to face an open face of the annular recess of the rotor so as to cover the open face; and an annular pad attached to the annular plate and brought into contact with the rotor on the outer peripheral side of the annular recess of the rotor.

2. A dustproof implement as claimed in claim 1, wherein the support plate of said coil and said annular plate are fixed on said housing body with a plurality of machine screws penetrating both plates.

3. A method of dustproofing a gap between a stationary coil member and a rotating rotor member of a clutch that is adjacent to a compressor housing, wherein the gap has a first thickness and wherein the coil member is fixed to a support plate that is fastened to the compressor, the method comprising the steps of:

fitting between the support plate and the compressor a thin annular plate having a thickness that is less that the first thickness and also having a radial periphery; and mounting a compressible pad to the radial periphery of the thin annular plate to engage the outermost radial part of the rotor member thereby to seal the gap.

4. The method of claim 3 including the steps of attaching the thin annular plate to the compressor using fasteners that are also used for securing the support plate to the compressor.

5. The method of claim 3 wherein the outermost radial part of the rotor member has a first diameter, the method including the step of sizing the thin annular plate and pad so that the pad has a diameter that is greater than the outermost radial part of the rotor member.

6. The method of claim 5 wherein the rotor member rotates about an axis, the method including the step of configuring the thin annular plate and pad so that contact between the pad an rotor member occurs in a plane that is perpendicular to the rotational axis of the rotor.

7. A clutch and dustproofing assembly, comprising:

a compressor housing having a support surface;

a coil member fixed to a support plate and fastened to the support surface of the compressor housing;

a rotor member rotatable about an axis and mounted adjacent to the support surface and having an annular recess within which fits the coil member with a gap defined between the coil member and the rotor member;

an annular plate fastened between the support surface and the coil member support plate and having a radial periphery; and an annular pad attached to the radial periphery of the thin annular plate and engaging the rotor member in a plane that is perpendicular to the axis of the rotor member.

8. The assembly of claim 7 wherein the rotor member has a radially outermost portion and wherein the annular pad has a diameter that is greater than the radially outermost portion thereby to retain engagement between the pad and rotor member in instances where the rotation of the rotor member is eccentric about the axis.

9. The assembly of claim 7 wherein the annular plate include a bent portion that extends at a right angle relative to the surface to which the annular plate is fastened thereby to cover the outermost radial surface of the pad.

* * * * *